United States Patent
Crossley et al.

(10) Patent No.: US 9,785,417 B2
(45) Date of Patent: *Oct. 10, 2017

(54) MANAGING REUSABLE ARTIFACTS USING PLACEHOLDERS

(71) Applicant: International Business Machines Corporation, Armonk, NY (US)

(72) Inventors: Nicholas D. J. Crossley, Bainbridge Island, WA (US); Troy R. Dugger, Keller, TX (US); David J. Honey, Crookham Village (GB); Samuel Sung-Ok Lee, Irvine, CA (US); Schuyler B. Matthews, Cary, NC (US); Darcy L. Wiborg Weber, Mission Viejo, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,399

(22) Filed: Jan. 19, 2016

(65) Prior Publication Data

US 2016/0139889 A1 May 19, 2016

Related U.S. Application Data

(63) Continuation of application No. 14/022,884, filed on Sep. 10, 2013, now Pat. No. 9,268,805.

(51) Int. Cl.
*G06F 9/44* (2006.01)
*G06F 17/30* (2006.01)

(52) U.S. Cl.
CPC .................. *G06F 8/36* (2013.01); *G06F 8/71* (2013.01); *G06F 17/30309* (2013.01)

(58) Field of Classification Search
None
See application file for complete search history.

(56) References Cited

U.S. PATENT DOCUMENTS

| 5,649,200 A | 7/1997 | Leblang et al. |
| 5,805,889 A | 9/1998 | Vande Vanter |

(Continued)

FOREIGN PATENT DOCUMENTS

| JP | 2007128450 | 5/2007 |
| JP | 2007226376 A1 | 9/2007 |

(Continued)

OTHER PUBLICATIONS

Estublier, J. et al., "Impact of Software Engineering Research on the Practice of Software Configuration Management," ACM Trans. On Software Engineering and Methodology (TOSEM), vol. 14, No. 4, pp. 383-430, Oct. 2005, retrieved from the Internet: <http://dl.acm.org/citation.cfm?id=1101817>.

(Continued)

*Primary Examiner* — Chuck Kendall
(74) *Attorney, Agent, or Firm* — Cuenot, Forsythe & Kim, LLC

(57) ABSTRACT

Arrangements described herein relate to managing reusable artifacts. Responsive to receiving a request to create a placeholder for a reusable artifact representing a reusable unit, the placeholder for an appropriate version of the reusable artifact is created within a container and a first parameter identifying the reusable artifact is assigned to an artifact property of the placeholder. Responsive to receiving a request to pin a particular version of the reusable artifact to the placeholder, a version property of the placeholder can be updated to set the version, wherein the request to pin the particular version of the reusable artifact to the placeholder is implemented by assigning a value to a parameter in the placeholder or adding a pin property into the placeholder.

(Continued)

The particular version can be maintained as the set version of the reusable artifact regardless of whether new artifact versions are created for the reusable artifact.

9 Claims, 4 Drawing Sheets

(56) References Cited

U.S. PATENT DOCUMENTS

| | | | |
|---|---|---|---|
| 5,881,292 A | 3/1999 | Sigal et al. | |
| 6,021,415 A | 2/2000 | Cannon et al. | |
| 6,460,052 B1 | 10/2002 | Thomas et al. | |
| 6,681,382 B1 | 1/2004 | Kakumani et al. | |
| 6,904,454 B2 | 6/2005 | Stickler | |
| 7,085,768 B2 | 8/2006 | Scott et al. | |
| 7,322,024 B2 | 1/2008 | Carlson et al. | |
| 7,322,025 B2 | 1/2008 | Reddy et al. | |
| 7,587,568 B2 | 9/2009 | Muthulingam et al. | |
| 7,631,006 B2 | 12/2009 | Hagstrom et al. | |
| 7,644,392 B2 | 1/2010 | Geipel et al. | |
| 7,895,563 B2 | 2/2011 | Carlson et al. | |
| 8,122,067 B2 | 2/2012 | Scott et al. | |
| 8,175,936 B2 | 5/2012 | Ronen et al. | |
| 8,230,387 B2 | 7/2012 | Srivastava et al. | |
| 8,909,875 B1 | 12/2014 | Ostapovicz et al. | |
| 9,223,813 B2 | 12/2015 | Crossley et al. | |
| 9,268,805 B2 * | 2/2016 | Crossley | G06F 8/36 |
| 9,275,089 B2 | 3/2016 | Crossley et al. | |
| 9,483,505 B2 | 11/2016 | Crossley et al. | |
| 2003/0033590 A1 | 2/2003 | Leherbauer | |
| 2003/0115223 A1 | 6/2003 | Scott et al. | |
| 2003/0208490 A1 | 11/2003 | Larrea et al. | |
| 2006/0282480 A1 | 12/2006 | Johnson et al. | |
| 2006/0288054 A1 | 12/2006 | Johnson et al. | |
| 2007/0255765 A1 | 11/2007 | Robinson | |
| 2007/0265862 A1 | 11/2007 | Freund et al. | |
| 2008/0133558 A1 | 6/2008 | Carlson et al. | |
| 2008/0320496 A1 | 12/2008 | Barinov et al. | |
| 2009/0083268 A1 | 3/2009 | Coqueret et al. | |
| 2009/0171971 A1 | 7/2009 | Goddard et al. | |
| 2010/0153912 A1 | 6/2010 | Porras et al. | |
| 2010/0153917 A1 | 6/2010 | Kramer et al. | |
| 2011/0010687 A1 | 1/2011 | Plante | |
| 2011/0167042 A1 | 7/2011 | Moore, Jr. et al. | |
| 2012/0054219 A1 | 3/2012 | Narendra et al. | |
| 2012/0096425 A1 | 4/2012 | Gupta et al. | |
| 2014/0279974 A1 | 9/2014 | Crossley et al. | |
| 2015/0046415 A1 | 2/2015 | Crossley et al. | |
| 2015/0074067 A1 | 3/2015 | Crossley et al. | |
| 2015/0074643 A1 | 3/2015 | Crossley et al. | |
| 2016/0139890 A1 | 5/2016 | Crossley et al. | |
| 2017/0039042 A1 | 2/2017 | Crossley et al. | |

FOREIGN PATENT DOCUMENTS

| | | | |
|---|---|---|---|
| JP | 4786998 B2 | 10/2011 | |
| WO | 2008133977 A1 | 11/2008 | |

OTHER PUBLICATIONS

Lucia, A.D. et al., "Recovering traceability links in software artifact management systems using information retrieval methods", ACM Transactions on Software Engineering and Methodology (TOSEM), vol. 16, No. 4, Art. 13, Sep. 2007, 50 pgs.

Novakouski, M. et al., "Best Practices for Artifact Versioning in Service-Oriented Systems", Carnegie Mellon Software Engineering Institute, Technical Note CMU/SEI-2011-TN-009, Jan. 2012, 42 pgs.

Vieira, M. et al., "Integrating GQM and Data Warehousing for the Definition of Software Reuse Metrics", In Software Engineering Workshop (SEW), 2011 34th IEEE, pp. 112-116, IEEE, 2011.

Babu, K.M., et al., "Searching Technique in Retrieving Software Reusable Components from a Repository", [Online]International Journal of Scientific and Research Publications, 2012 [retrieved Feb. 7, 2012], retrieved from the Internet: <http://www.ijsrp.org/research_paper_feb2012/ijsrp-feb-2012-23.pdf>, 3 pg.

White, J. et al., "Automating Product-Line Variant Selection for Mobile Devices", In Proc. of 11th Int'l. Software Product Line Conference (SPLC '07), IEEE © 2007, 10 pg.

"Performing Common Database Storage Tasks", [Online] In Oracle Databse 2 Day DBA 11g Release 1 (11.1) Part No. 828301-03 © 2004, 2008, Jul. 2007 [retrieved Sep. 20, 2012] retrieved from the Internet: <http://isu.ifmo.ru/docs/doc111/server.111/b28301/storage003.htm#BABHGIAG>, 10 pg.

"Reclaiming Unused Space in Datafiles", [Online] Oracle-Base, ORACLE-BASE.com © 2000, 2013 [retrieved Aug. 8, 2013], retrieved from the Internet: <www.oracle-base.com/articles/misc/reclaiming-unused-space.php>, 7 pg.

"StarTeam Best Practices—The StarTeam Model", [Online] Fox Consult © 1993-2013 [retrieved Aug. 8, 2013], <http://www.foxdata.com/starteam/best_practices/the_starteam_model.htm>, 28 pg.

Van Gurp, J., "Variability in Software Systems: The Key to Software Reuse" [Online] Licentiate Theses, University of Groningen, Sweden, Oct. 2000, 194 pg.

Beuche, D., "What's the difference? A Closer Look at Configuration Management for Product Lines" [Online] Product Line Engineering Blog, Mar. 13, 2010 [retrieved Aug. 8, 2013], retrieved from the Internet: <http://productlines.wordpress.com/2010/03/13/whats-the-difference-a-closer-look-at-configuration-management-for-product-lines/>, 4 pg.

Holtman, K. et al., "RFC 2296—HTTP Remote Variant Selection Algorithm—RVSA/1.0", [Online] Network Working Group, Mar. 1998 [retrieved Aug. 8, 2013], retrieved from the Internet: <http://tools.ietf.org/html/rfc2296>, 14 pg.

"Variant Selection Criteria", [Online] IBM Mobile Portal Accelerator, Multichannel Server, IBM Corp. [retrieved Jul. 31, 2013] <http://pic.dhe.ibm.com/infocenter/mpadoc/v6r1m0/index.jsp?topic=%2Fcom.volantis.mcs.eclipse.doc%2Fcomponents%2Fasset_selection_criteria.html>, 2 pg.

White, J. et al., "Automatically composing reusable software components for mobile devices", In Journal of Brazilian Computer Society, vol. 14, No. 1, Mar. 2008 [retrieved Aug. 8, 2013], retrieved from the Internet: <http://www.scielo.br/scielo.php?script=sci_arttext&pid=S0104-65002008000100004>, 26 pg.

Hopp, W. J. et al., "Product Line Selection and Pricing with Modularity in Design", In Manufacturing & Service Operations Mgmt., vol. 7, No. 3, Summer 2005, pp. 172-187.

U.S. Appl. No. 13/837,559, Non-Final Office Action, Mar. 24, 2015, 7 pg.

U.S. Appl. No. 13/837,559, Final Office Action, Aug. 31, 2015, 11 pg.

U.S. Appl. No. 13/837,559, Advisory Action, Dec. 31, 2015, 5 pg.

U.S. Appl. No. 14/022,884, Non-Final Office Action, Apr. 23, 2015, 10 pg.

U.S. Appl. No. 14/022,884, Notice of Allowance, Oct. 23, 2015, 9 pg.

U.S. Appl. No. 14/231,054, Non-Final Office Action, Apr. 23, 2015, 14 pg.

U.S. Appl. No. 14/231,054, Notice of Allowance, Nov. 9, 2015, 10 pg.

U.S. Appl. No. 14/523,400, Non-Final Office Action, Mar. 24, 2015, 8 pg.

U.S. Appl. No. 14/523,400, Notice of Allowance, Aug. 5, 2015, 7 pg.

U.S. Appl. No. 13/837,559, Non-Final Office Action, Feb. 12, 2016, 9 pg.

U.S. Appl. No. 13/837,559, Notice of Allowance, Jul. 14, 2016, 8 pg.

U.S. Appl. No. 15/000,462, Non-Final Office Action, Jan. 9, 2017, 16 pg.

\* cited by examiner

700

```
┌─────────────────────────────────────────────────────────────┐
│ Receive a request to create a placeholder for a reusable   │
│ artifact representing a reusable unit, the request          │
│ including a parameter identifying the reusable artifact     │
│ 702                                                         │
└─────────────────────────────────────────────────────────────┘
                            ↓
                      ╱ Does the ╲
                    ╱  request include a  ╲         No
                  ╱ parameter indicating a  ╲───────────┐
                  ╲ particular version of the╱          │
                    ╲ reusable artifact?    ╱           │
                      ╲    704    ╱                     │
                            ↓ Yes                       │
┌─────────────────────────────────────────────────────────────┐
│ Create a placeholder for an appropriate version of the      │
│ reusable artifact within a container, wherein the           │
│ properties of the placeholder resolve to a version of the   │
│ reusable artifact indicated by the version parameter        │
│ 706                                                         │
└─────────────────────────────────────────────────────────────┘
                            ↓
                      ╱ Does the ╲
                    ╱  request include  ╲           No
                  ╱ one or more parameters╲─────────┐
                  ╲ indicating a particular╱        │
                    ╲ branch of the      ╱          │
                      ╲ reusable artifact?╱         │
                        ╲   708   ╱                 │
                            ↓ Yes                   │
┌─────────────────────────────────────────────────────────────┐
│ Create a placeholder for an appropriate version the         │
│ reusable artifact within the container, wherein the         │
│ properties of the placeholder resolve to a latest version   │
│ of the reusable artifact in a particular branch indicted    │
│ by the branch parameter(s)                                  │
│ 710                                                         │
└─────────────────────────────────────────────────────────────┘
                            ↓
┌─────────────────────────────────────────────────────────────┐
│              Create an empty placeholder                    │
│                         712                                 │
└─────────────────────────────────────────────────────────────┘
```

FIG. 7

MANAGING REUSABLE ARTIFACTS USING PLACEHOLDERS

BACKGROUND

Arrangements described herein relate to management of reusable artifacts.

Creating applications or systems from reusable components is common as a means to accelerate the delivery of solutions and reduce cost. Tracking the evolution of systems over time requires versioning, both for individual units of data and for configurations. The use of versioning provides the ability to view the history of individual units of data and compare any two versions of data to identify the changes between them, and the ability to view the history of a configuration to see how the data has changed over time. Today, the primary means of managing and tracking evolution of a system is via a configuration management system. A configuration management system requires a user to manually manage workspaces, and manually check out and check in data, assign new versions to the data, etc.

BRIEF SUMMARY

One or more embodiments disclosed within this specification relate to managing reusable artifacts.

A method of managing reusable artifacts includes, responsive to receiving a request to create a placeholder for a reusable artifact representing a reusable unit, using a processor, creating the placeholder for an appropriate version of the reusable artifact within a container and assigning a first parameter identifying the reusable artifact to an artifact property of the placeholder. The method also can include, responsive to receiving a request to pin a particular version of the reusable artifact to the placeholder, updating a version property of the placeholder to set the version, wherein the request to pin the particular version of the reusable artifact to the placeholder is implemented by assigning a value to a parameter in the placeholder or adding a pin property into the placeholder. The method also can include maintaining the particular version as the set version of the reusable artifact regardless of whether new artifact versions are created for the reusable artifact.

BRIEF DESCRIPTION OF THE SEVERAL VIEWS OF THE DRAWINGS

FIG. 7 is a flow chart illustrating a method of managing reusable artifacts in accordance with an arrangement disclosed within this specification.

DETAILED DESCRIPTION

Figure 1:
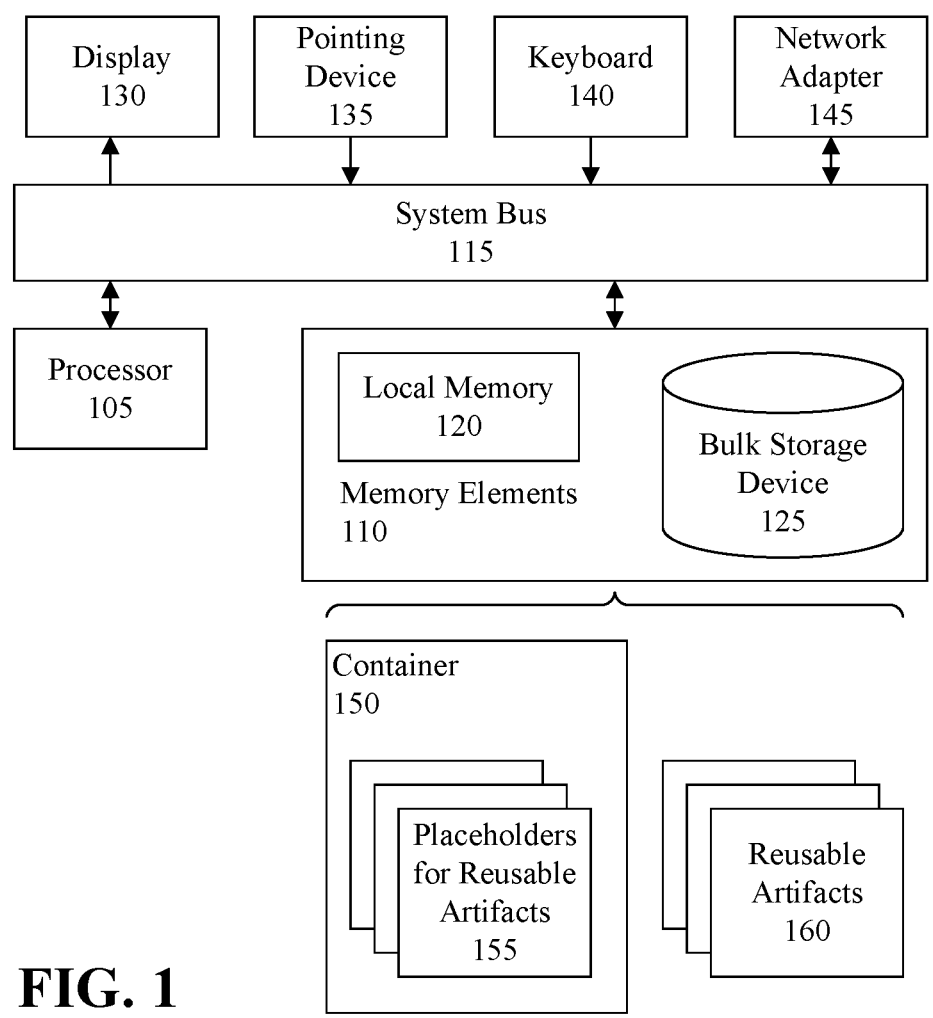
FIG. 1 is a block diagram illustrating a processing system in accordance with an arrangement disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon. Any combination of one or more computer-readable medium(s) may be utilized. The computer-readable medium may be a computer-readable signal medium, a computer-readable storage medium, or a combination thereof.

As defined herein, the term "computer-readable storage medium" means a storage medium that contains or stores program code for use by or in connection with an instruction execution system, apparatus, or device. As defined herein, a "computer-readable storage medium" is not a transitory propagating signal per se. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to managing reusable artifacts. Specifically, reusable artifacts, each of which may contain various versions and/or variants, are easily managed or interchanged. Moreover, correct versions/variants of the artifacts are automatically selected and dynamically consumed when they become available. A user can control the exact versions/variants of the artifacts that are desired, if needed, all without needing to learn advanced configuration management system concepts, and without need to manage streams or workspaces.

Several definitions that apply throughout this document will now be presented.

As defined herein, the term "artifact" means a computer-based structure created to represent a reusable unit, such as a product (e.g., an article of manufacture, an application, a service, a system, or the like), a component of an assembly, a component of program code (e.g., a function, a method, a module, etc.), a component of a document (e.g., a section, a chapter, etc.), etc. An artifact, for instance, can comprise information (e.g., data) pertaining to a reusable unit that may be reused among different assemblies, different groups of program code, etc. Moreover, an artifact can be a tangible object or an intangible object. Examples of an artifact include, but are not limited to, a product identification, a product specification, a drawing (e.g., a computer-aided design (CAD) drawing), a bill of materials, a procedure, computer-program code (e.g., a modules, routine, sub-routine, or the like), marketing material, and the like.

An artifact can be associated with one or more other artifacts, such as parent and/or one or more child artifacts. In illustration, artifacts can be associated with one another in a hierarchy comprising a first parent artifact having one or more children artifacts, and one or more of the children artifacts themselves can be parent artifacts to other children artifacts. For example, a parent artifact can be a product identification, and the parent artifact can be associated with children artifacts corresponding to the product, for example a product specification, identifiers for components of the product (e.g., a bill of materials), drawings of the product, drawings of components of the product, etc. An artifact which is a parent to other artifacts also can be a child artifact to its parent artifact. For example, an artifact can be an identifier for a component of the product, and thus be a child artifact to the artifact representing the product, but also have children artifacts, for example drawings, specifications, etc. for the component, and children artifacts for sub-components of the component, and so on.

As defined herein, the term "object version," "version of an object," or the like means a particular form of a reusable object differing in certain respects from an earlier form or other forms of the same type of reusable object.

As defined herein, the term "abstract version," "version of an abstract," or the like means a particular form of an abstract representing a particular form of a reusable object differing in certain respects from an earlier form or other forms of the same type of reusable object.

As defined herein, the term "branch" means a set of one or more abstract versions, wherein the set of one or more abstract versions represents a particular variant of a reusable object. If an artifact includes a plurality of branches, each branch represents a different variant of a reusable object.

FIG. 1 is a block diagram illustrating a processing system in accordance with one arrangement disclosed within this specification. The processing system 100 can include at least one processor 105 (e.g., a central processing unit) coupled to memory elements 110 through a system bus 115 or other suitable circuitry. As such, the processing system 100 can store program code within the memory elements 110. The processor 105 can execute the program code accessed from the memory elements 110 via the system bus 115. It should be appreciated that the processing system 100 can be implemented in the form of any system including a processor and memory that is capable of performing the functions and/or operations described within this specification. For example, the processing system 100 can be implemented as a computer, a workstation, a mobile computer, a laptop computer, tablet computer, a smart phone, a personal digital assistant, a gaming device, an appliance, and so on.

The memory elements 110 can include one or more physical memory devices such as, for example, local memory 120 and one or more bulk storage devices 125. Local memory 120 refers to RAM or other non-persistent memory device(s) generally used during actual execution of the program code. The bulk storage device(s) 125 can be implemented as a hard disk drive (HDD), solid state drive (SSD), or other persistent data storage device. The processing system 100 also can include one or more cache memories (not shown) that provide temporary storage of at least some program code in order to reduce the number of times program code must be retrieved from the bulk storage device 125 during execution.

Input/output (I/O) devices such as a display 130, a pointing device 135 and a keyboard 140 can be coupled to the processing system 100. The I/O devices can be coupled to the processing system 100 either directly or through intervening I/O controllers. For example, the display 130 can be coupled to the processing system 100 via a graphics processing unit (GPU), which may be a component of the processor 105 or a discrete device. One or more network adapters 145 also can be coupled to processing system 100 to enable processing system 100 to become coupled to other systems, computer systems, remote printers, and/or remote storage devices through intervening private or public networks. Modems, cable modems, transceivers, and Ethernet cards are examples of different types of network adapters 145 that can be used with processing system 100.

As pictured in FIG. 1, the memory elements 110 can store a container 150 that contains placeholders 155 for reusable artifacts 160 (hereinafter "artifacts"). The memory elements 110 also can store the artifacts 160. Being stored in the memory elements 110 when processed by the processor 105, these components can be considered part of the processing system 100. Moreover, the container 150, placeholders 155 and artifacts 160 are functional data structures that impart functionality when employed as part of the processing system 100.

As noted, each artifact 160 represents a reusable unit. A respective placeholder 155 can be created in the container 150 for one or more versions of the artifact 160. The placeholders 155 can serve to indicate one or more versions of the artifact representing versions and/or variants of the reusable units that are noteworthy, for example versions and/or variants of the reusable units that are used to produce products, assemblies, etc. Each placeholder 155 can include one or more properties, such as an artifact identifier (ID), a version ID and a branch ID, and be assigned to each placeholder 155. The artifact ID can be the same for all versions of a particular artifact 160. The version ID can be unique for each version of the artifact 160. The branch ID can provide a namespace within the artifact 160 to differentiate variants of the particular artifact 160. A placeholder 155 can select a particular version of the artifact 160 using simple matching rules for the artifact ID, branch ID and version ID.

For example, if only an artifact ID is specified for the placeholder 155, the latest version of the artifact 160, regardless of its version and branch IDs, can be associated with the placeholder 155. If an artifact ID and branch ID are specified for the placeholder 155, the latest version of the artifact 160 in the branch corresponding to the branch ID can be associated with the placeholder 155. If an artifact ID and version ID are specified for the placeholder 155, the version of the artifact 160 precisely corresponding to the version ID can be associated with the placeholder 155. These concepts combine to create a highly flexible automated container to manage various versions and variants of the artifacts. Moreover, the container can identify exactly which reusable artifacts belong in the container, and automatically retrieve updates as new artifact versions are created. Using the methods and processes described herein, the container is assured to choose correct variants and/or versions of artifacts when such artifacts are accessed.

Figure 2:
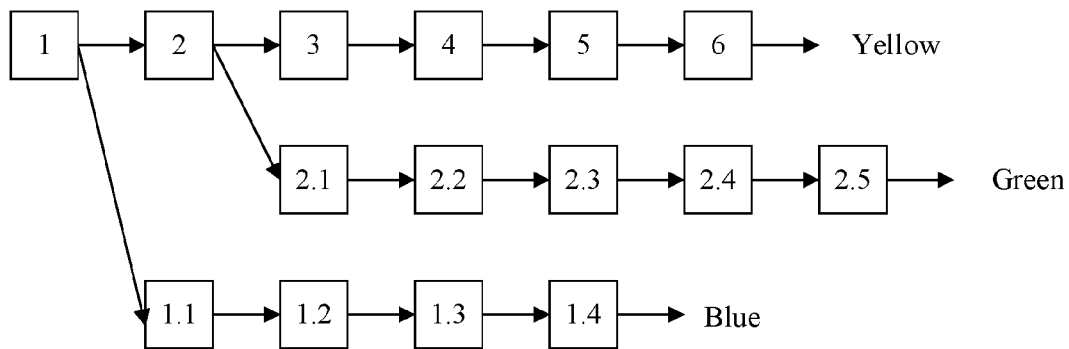
FIG. 2 is diagram illustrating an example reusable artifact having various versions and branches in accordance with an arrangement disclosed within this specification.

FIG. 2 is diagram illustrating an example reusable artifact 200 having various versions and branches in accordance with an arrangement disclosed within this specification. The artifact can have a plurality of versions and branches. In illustration, in a "Yellow" branch, the artifact can include versions 1, 2, 3, 4, 5 and 6. A "Green" branch can branch from version 2 and include versions 2.1, 2.2, 2.3, 2.4, 2.5. A "Blue" branch can branch from version 1, and include versions 1.1, 1.2, 1.3, 1.4. One or more placeholders can be created for one or more versions of the artifact 200, as discussed with respect to FIG. 3.

Figure 3:
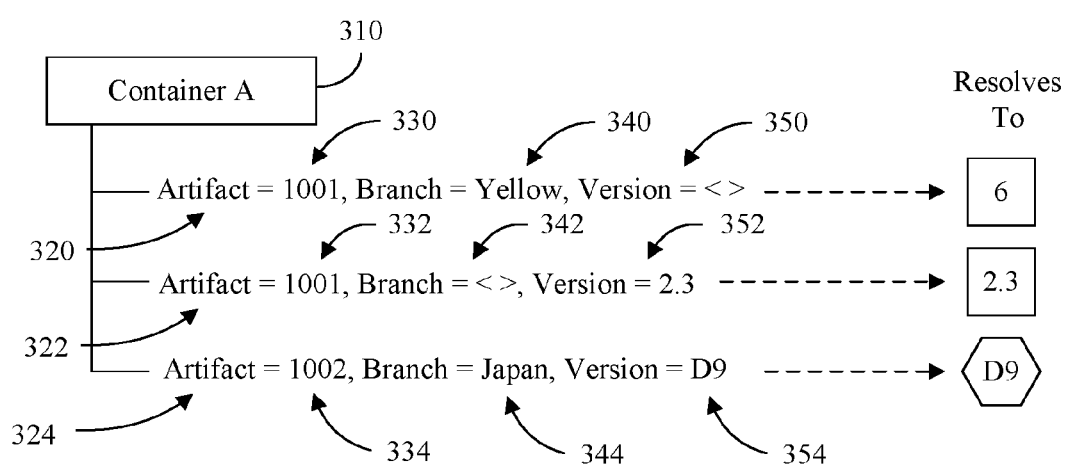
FIG. 3 is diagram depicting an example of a container containing a plurality of placeholders in accordance with an arrangement disclosed within this specification.

FIG. 3 is diagram 300 depicting an example of a container 310 containing a plurality of placeholders 320, 322, 324 in accordance with an arrangement disclosed within this specification. Each placeholder 320, 322, 324 can be assigned two or more parameters. In illustration, each placeholder 320, 322, 324 can include a property that includes a respective parameter 330, 332, 334 indicating an artifact for which the placeholder is created. Further, each placeholder 320, 322, 324 can be assigned a parameter 340, 344 indicating a branch of the artifact and/or a parameter 352, 354 indicating a specific version of the artifact. In this regard, the placeholder can, for example, include any of the properties identified in Table 1:

TABLE 1

| Placeholder Properties | Behavior |
|---|---|
| A: < >: < > | Resolves to the latest version of artifact A on any branch. (Depending on the implementation, an exception may be generated if the latest version of artifact is not identifiable. |
| A: B: < > | Resolves to the latest version of artifact A on branch B. |
| A: < >: V | Resolves to version V of artifact A. |
| A: B: V | Resolves to version V of artifact A. If version V is not on branch B, an exception may be generated. |

A time property (not shown) also can be included. The time property can be a timestamp that indicates when the corresponding placeholder was created.

In illustration, the placeholder 320 can be include a property "Artifact=1001," wherein "1001" can be a parameter (e.g., ArtifactID) assigned to the artifact for which the placeholder 320 is created. The placeholder 320 also can include a property "Branch=Yellow," where "Yellow" can be a parameter (e.g., BranchID) indicating a particular branch of the artifact "1001." In this example, a version parameter (e.g., VerisonID) may be assigned to a version property 350, but this is not a requirement. In the case that a version parameter is not assigned to the placeholder 320, in which the version property 350 can indicate a null value (e.g. "< >"), the latest version on the "Yellow" branch can be associated with that placeholder 320. If the artifact is later updated with a new version, that new version can be automatically associated with the placeholder 320 by nature of the placeholder 320 not specifying a particular version. In this example, the latest version of the abstract in the "Yellow" branch (FIG. 2) is version 6, thus the placeholder can resolve to version 6 of artifact 1001.

In one aspect, a plurality of parameters can be assigned to the branch property 340. For example, the branch property can indicate "Color=Yellow, Country=Japan." Thus, if there are variants of the reusable artifact for different countries, such as Japan and the U.S., and for each country there is a "Yellow" branch in addition to other branches, the branch property 340 can indicate the "Yellow" branch for Japan. The present arrangements are not limited to the number of parameters that can be assigned to the branch property.

The placeholder 322 can include a property "Artifact=1001," wherein "1001" can be a parameter assigned to the artifact for which the placeholder 322 is created. The placeholder 322 also can include a property "Version=2.3," wherein "2.3" can be a parameter indicating a specific version of the artifact "1001." Since version 2.3 is contained in the "Green" branch (FIG. 2), a parameter indicating the branch need not be assigned to a branch property 342 of the placeholder 322, in which case the branch property can indicate a null value (e.g. "< >"). In this example, the placeholder 322 can resolve to version 2.3 of artifact 1001.

Sometimes, new versions of artifacts are created that are not yet ready to release, or may not be applicable to certain products, processes, etc. Accordingly, a user can choose to pin a particular version to a particular placeholder. In this case, by assigning the version parameter "2.3," that version of the artifact "1001" can be pinned to the placeholder 322. In one arrangement, a pin property, such as "Pin=Yes," can be provided in the placeholder 322 to pin the version "2.3" to the placeholder 322. When the parameter assigned to the pin property is "Yes," the version assigned to the version property can be locked so that it is not updateable. If the user desires to unpin the version from the placeholder 322, the user can request that the parameter assigned to the pin property be changed to "No," or request that the pin property be removed from the placeholder 322. In response, the version can be unpinned from the placeholder 322 and the user can be free to update the placeholder 322 with a desired version.

The placeholder 324 can include a property "Artifact=1002," wherein "1002" can be a parameter assigned to the artifact for which the placeholder 322 is created. Since the parameter "1002" is different than the parameter "1001," the placeholder 322 is created for a different artifact than the placeholders 320, 324. The placeholder 320 also can include a property "Branch=Japan," where "Japan" can be a parameter indicating a particular branch of the artifact "1002." Further, the placeholder 322 also can include a property "Version=D9," wherein "D9" can be a parameter indicating a specific version of the artifact "1002." In this example, the placeholder 324 can resolve to version D9 of artifact 1002 (not shown in FIG. 2).

At any time a user can choose to add new placeholders to the container 310 by generating a request specifying a parameter corresponding to a particular artifact (e.g., ArtifactID). Optionally, one or more additional parameters can be specified. An additional parameter can be a branch identifier (e.g., Branch ID) or a version identifier (e.g., VersionID), or both a branch identifier and a version identifier can be specified. In response to receiving the request, a corresponding new placeholder can be created in the container 310. Further, the user can choose to remove one or more placeholders or an entire artifact from the container 310. In the case that the user chooses to remove an artifact, in response to such request, each placeholder associated with the artifact can be automatically removed from the container 310.

In one arrangement, a user can choose to add an empty placeholder to the container 310, which can be assigned parameters at a later time. In illustration, a user can request an empty placeholder be created and, in response, an empty placeholder can be created. The properties for the empty placeholder can be "Artifact=< >, Branch=< >, Version=< >." Two or more parameters can be assigned to the placeholder when it is desired to use the placeholder to identify a particular version of an artifact. In another aspect, the user can add an empty placeholder assigned to a particular artifact, but not assign a branch identifier nor a version identifier. In this case, the latest version of the artifact can be assumed. In another aspect, the user can later add a parameter for a branch identifier and/or a parameter for a version identifier at a later point in time.

In another arrangement, a user can request that a particular version of an artifact in a particular branch be replaced with another version of the artifact from another branch. In response to such request, at least one parameter assigned to the placeholder (e.g. BranchID and/or VersionID) can be changed/updated. In illustration, if the user chooses to change from version "2.3" to version "2.5" of artifact "1001" assigned to the placeholder 322, the placeholder 322 can be updated accordingly.

Figure 4:
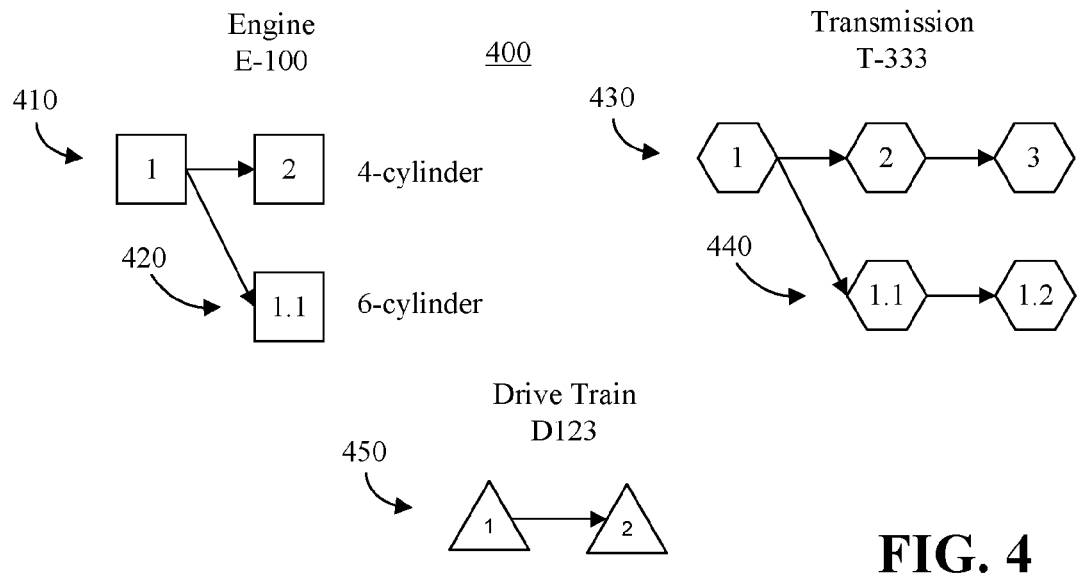
FIG. 4 is diagram illustrating examples reusable artifacts having various versions and branches in accordance with an arrangement disclosed within this specification.

FIG. 4 is diagram 400 illustrating examples reusable artifacts having various versions and branches in accordance with an arrangement disclosed within this specification. In this example, the artifacts depicted are an "Engine" with an ArtifactID "E-100", a "Transmission" with an ArtifactID "T-333" and a "Drive Train" with an ArtifactID "D123". The artifact E-100 can include a branch 410 including versions "1" and "2" of the engine, and a branch 420 including a version "1.1" of the engine. The versions 1 and 2 can represent versions of a 4-cylinder variant of the engine, and the version 1.1 can represent a 6-cylinder variant of the engine. The artifact T-33 can include a branch 430 including versions "1," "2" and "3" representing versions of a particular variant of the transmission, and a branch 440 including versions "1.1" and "1.2" representing another variant of the transmission. The artifact D123 can include a branch 450 including versions "1" and "2" of a particular variant of the drive train.

Figure 5:
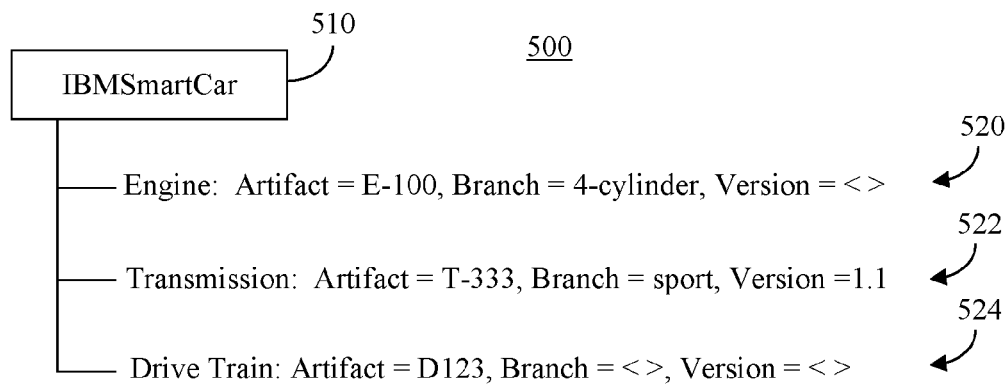
FIG. 5 is diagram depicting an example of a container containing a plurality of placeholders in accordance with an arrangement disclosed within this specification.

FIG. 5 is diagram 500 depicting an example of a container 510 containing a plurality of placeholders 520, 522, 524 in accordance with an arrangement disclosed within this specification. Reference now is made to FIGS. 4 and 5.

In this example, the container is titled "IBMSmartCar" and includes a placeholder 520 for the engine used in the "IBMSmartCar." The placeholder can be titled "Engine," and can include an artifact property specifying "Artifact=E-100," a branch property specifying "Branch=4-cylinder," and a version property specifying "Version=< >," thus indicating a null value. In this example, the placeholder 520 can resolve to the latest version of the 4-cylinder variant of the E-100 engine, which is version "2". Since the version is not specified, if a new version of the 4-cylinder variant of the E-100 engine is created, the placeholder 520 can automatically resolve to that new version when the new version is created.

The container 510 also can include a placeholder 522 titled "Transmission." The placeholder 520 can include an artifact property specifying "Artifact=T-333," a branch property specifying "Branch=sport," and a version property specifying "Version=1.1." In this example, the placeholder 522 can resolve to version 1.1 of the T-333 transmission.

The container 510 also can include a placeholder 522 titled "Drive Train." The placeholder 522 can include an artifact property specifying "Artifact=D123," a branch property specifying "Branch=< >," and a version property specifying "Version=< >." In this example, the placeholder 524 can resolve to version 2 of the D123 drive train. Since only one branch 450 exists for the artifact D123, the branch property need not specify a branch—the branch that exists can be assumed. Further, since a version is not specified in the version property, the latest version can be assumed. Again, since the version is not specified, if a new version of the D123 drive train is created, the placeholder 530 can automatically resolve to that new version when the new version is created.

Figure 6:
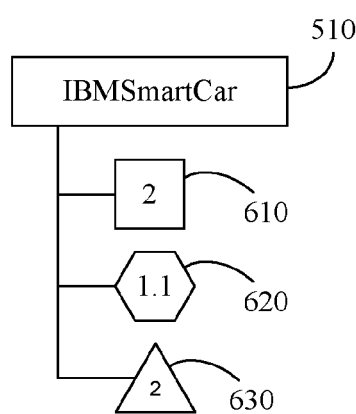
FIG. 6 is a diagram depicting an example of how properties associated with the placeholders of FIG. 5 resolve to the container.

FIG. 6 is a diagram 600 depicting an example of how properties associated with the placeholders 520 of FIG. 5 resolve to the container 510. Specifically, the artifact for version 2 of the 4-cylinder E-100 engine can be associated with the container 510 and depicted in a respective placeholder 610, the artifact for version 1.1 of the second variant of the T-333 transmission can be associated with the container 510 and depicted in a respective placeholder 620, and version 2 of the D123 drive train can be associated with the container 510 and depicted in a respective placeholder 630. The diagram 600, including a the container 510 and the placeholders 610-630, can be presented to a user to indicate the reusable units being used for the unit for which the container 510 has been created, in this case the "IBMSmart-Car." The diagram 600 can be depicted on a display, a printout, or in any other suitable manner. As noted, a user can change or update the placeholders as described herein. Moreover, the diagram 600 can be dynamically updated when any properties of the placeholders 520-524 are updated, or new versions of artifacts are created and the placeholder properties resolve to the new versions.

FIG. 7 is a flow chart illustrating a method of 700 managing reusable artifacts in accordance with an arrangement disclosed within this specification. At step 702, a request to create a placeholder for a reusable artifact representing a reusable unit can be received. The request can include a parameter identifying the reusable artifact. Referring to decision box 704, a determination can be made as to whether the request includes a parameter indicating a particular version of the reusable artifact. If so, at step 706, a placeholder for an appropriate version of the reusable artifact can be created within a container. The properties of the placeholder can resolve to a version of the reusable artifact indicated by the version parameter, which is the appropriate version of the artifact.

If the request does not include a parameter indicating a particular version of the reusable artifact, the process can proceed to decision box 708. At decision box 708, a determination can be made as to whether the request includes one or more parameters indicating a particular branch of the reusable artifact. If so, at step 710, a placeholder for an appropriate version of the reusable artifact can be created within the container. In this case, the properties of the placeholder can resolve to a latest version of the reusable artifact in a particular branch indicted by the branch parameter(s), which is the appropriate version of the artifact. If, however, both a branch identifier and a version identifier are provided, then the properties can resolve to a version matching the version identifier that is in a branch matching the branch identifier.

If the request does not include one or more parameters indicating a particular branch of the reusable artifact, at step 712 an empty placeholder can be created. In one arrangement, the empty placeholder can be associated with the reusable artifact identified by the artifact parameter. A parameter identifying a particular branch of the artifact and/or a parameter identifying a particular version can be of the artifact can be added to the placeholder at a later time. If a placeholder creation request is received that does not include a parameter identifying a particular reusable artifact, an association of the placeholder with a particular artifact would not take place, and can be created at a later time.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of managing reusable artifacts, comprising:
responsive to receiving a request to create a placeholder for a reusable artifact representing a reusable unit, using a processor, creating the placeholder for an appropriate version of the reusable artifact within a container and assigning a first parameter identifying the reusable artifact to an artifact property of the placeholder;
responsive to receiving a request to pin a particular version of the reusable artifact to the placeholder, updating a version property of the placeholder to set the version, wherein the request to pin the particular version of the reusable artifact to the placeholder is implemented by assigning a value to a parameter in the placeholder or adding a pin property into the placeholder; and
maintaining the particular version as the set version of the reusable artifact regardless of whether new artifact versions are created for the reusable artifact.

2. The method of claim 1, wherein:
the placeholder further comprises a branch property configured to indicate a first null value or a second parameter identifying a branch of the reusable artifact corresponding to a particular variant of the reusable artifact, and a version property configured to indicate a second null value or a third parameter identifying a particular version of the reusable artifact; and
responsive to the second parameter being assigned to the branch property and the third parameter not being assigned to the version property, the properties of the placeholder resolve to a latest version of the reusable artifact in a particular branch indicted by the second parameter.

3. The method of claim 2, wherein:
the branch property further is configured to indicate at least one other parameter in addition to the second parameter, the second parameter and at least one other parameter together identifying the branch of the reusable artifact corresponding to the particular variant of the reusable artifact.

4. The method of claim 1, wherein:
the placeholder further comprises a branch property configured to indicate a first null value or a second parameter identifying a branch of the reusable artifact corresponding to a particular variant of the reusable artifact, and a version property configured to indicate a second null value or a third parameter identifying a particular version of the reusable artifact; and
responsive to the second parameter not being assigned to the branch property and the third parameter being assigned to the version property, the properties of the placeholder resolve to a version of the reusable artifact indicated by the third parameter.

5. The method of claim 1, further comprising:
responsive to receiving a request to add a new reusable artifact to the container, creating a new placeholder for the new reusable artifact.

6. The method of claim 1, further comprising:
responsive to receiving a request to add an empty placeholder to the container, creating a new placeholder configured to be associated with a reusable artifact a later time.

7. The method of claim 1, further comprising:
responsive to receiving a request to remove the reusable artifact from the container, removing the placeholder from the container.

8. The method of claim 1, further comprising:
responsive to receiving a request to replace a particular version of a particular reusable artifact in a particular branch with another version of the reusable artifact from another branch, updating the first parameter assigned to the placeholder.

9. The method of claim 1, further comprising:
responsive to receiving a request to unpin the particular version of the reusable artifact from the placeholder, unpinning the particular version of the reusable artifact from the placeholder.

* * * * *